Patented Apr. 28, 1942

2,281,249

UNITED STATES PATENT OFFICE 2,281,249

GERMICIDAL CONCENTRATE

Luther S. Roehm, Midland, Mich., assignor to The Dow Chemical Company, Midland, Mich., a corporation of Michigan No Drawing. Application May 9, 1940,
Serial No. 334,269

5 Claims. (Cl. 167—31)

This invention relates to antiseptics and germicides and is particularly concerned with an improved water-miscible germicide concentrate comprising ortho-phenyl phenol.

Ortho-phenyl phenol and its salts are well known as bactericides. These compounds are employed in the form of dispersions, solutions, emulsions, and the like with water, organic solvents, soaps, and oils wherever a mild germicide is required which is substantially non-toxic to humans.

Ortho-phenyl phenol is substantially water-insoluble and in aqueous dispersion or emulsion tends to settle out or otherwise to separate from composition. This tendency is also shown by aqueous compositions containing the water-soluble salts of ortho-phenyl phenol. These compounds commonly hydrolyze on contact with water to give the free phenol which then precipitates out of the solution. To prevent such hydrolysis and dissociation, it is necessary to maintain an appreciable excess of alkali in compositions comprising the phenolates, whereby the usefulness of the composition is limited because of high alkalinity.

A further limitation on the use of ortho-phenyl phenol and its salts is that dilutions thereof frequently are not as effective as is desirable for an all-purpose germicide. This is particularly true where an oily diluent is employed, the germicidal effectiveness of such composition frequently being lower than might reasonably be anticipated from the coefficient of toxicity for the pure compound.

It is an object of the present invention to provide a water-miscible germicide concentrate comprising ortho-phenyl phenol as the active toxicant. It is a further object to provide a concentrate which may be diluted with water to form a relatively stable colloidal solution of free ortho-phenyl phenol. An additional object is to provide an oily concentrate comprising ortho-phenyl phenol, aqueous solutions of which have a relatively high phenol coefficient and are disproportionately effective against micro-organisms.

I have discovered that a composition containing from 15 to 40 per cent by weight of ortho-phenyl phenol dissolved in a liquid, partially neutralized sulphonation product of castor or sperm oil, or a mixture of such oils, is adapted to be employed as a germicide concentrate, and has desirable properties not accruing to analogous compositions in which other sulphonated oil products and phenols are employed. This concentrate is a liquid which does not degrade or decompose on standing and is readily miscible with water to form colloidal solutions which do not settle out over long periods of time. Furthermore, dilute aqueous dispersions prepared from concentrates having the indicated percentage composition, are much more effective as germicides than are simple aqueous dispersions of ortho-phenyl phenol or its water-soluble salts at comparable dilution. When less than 15 per cent by weight of ortho-phenyl phenol is employed in the composition, the comparative germicidal effectiveness of the diluted product is substantially reduced. When over 40 per cent is employed, there is a similar reduction in toxicity, with the added disadvantage that the diluted compositions are much less stable.

In operating according to the invention, 24 parts by weight of ortho-phenyl phenol are stirred and warmed with from 36 to 136 parts by weight of the partially neutralized sulphonated oil product. The resulting solution is an oily liquid which is water-white, yellow or brown, depending upon the degree of purity and refinement of the sulphonated product employed. This composition is stable over long periods of time, and adapted to be diluted with water to produce clear colloidal solutions or dispersions of free ortho-phenyl phenol.

The partially neutralized sulphonated oils which are used in combination with and as a carrier for ortho-phenyl phenol vary in appearance from light fluid products to dark, viscous sludge-like materials. They frequently contain from about 20 to 50 per cent by weight of moisture and from about 5 to 8.5 per cent $SO_3$ by analysis. The pH of dilute aqueous solutions of these products should be above 7.0. Those materials which have proven particularly satisfactory in the preparation of mixtures yielding dilute aqueous compositions of high effectiveness and stability are those which in 5 per cent aqueous solution have a pH value of 7.5 or higher.

The great increase in toxic effectiveness shown by ortho-phenyl phenol in combination with these sulphonated oil products has not been found to be a general characteristic accruing to all phenol compounds. For example, the halogenated phenyl phenols when similarly compounded and diluted with water display a germicidal effectiveness substantially below what might have been anticipated from their normal phenol coefficients.

The method for determining the phenol coefficients set forth in the following examples is the one developed by the United States Public Health Service, hygienic laboratory, and described in circular No. 198 of the Food and Drug Administration, United States Department of Agriculture. These values are based upon a coefficient of 1.0 for pure phenol. The phenol coefficient of ortho-phenyl phenol as the sodium salt, according to this method is 16.0.

The following examples are not to be construed as limiting, either with respect to the proportions employed or the particular sulphonated oil products disclosed.

Example 1

Ortho-phenyl phenol in varying amounts was warmed and stirred with a partially neutralized sulphonated castor oil product containing 40 per cent moisture, 7.5 per cent $SO_3$ by analysis, and having a pH value of 8.5 in 5 per cent aqueous solution. The phenol coefficient of this oily product was found to be less than 0.1 against *E. typhii*. The compositions of ortho-phenyl phenol in the sulphonated castor oil product were each diluted with sufficient water so as to obtain a dispersion of 1 gram of ortho-phenyl phenol in 100 milliliters of solution. Phenol coefficient determinations against *E. typhii* were made on the diluted composition obtained from concentrates in which the ortho-phenyl phenol was dissolved in 1, 2, 3, and 5 parts of sulphonated oil product. The apparent phenol coefficients for ortho-phenyl phenol in the various compositions were as follows:

| Percent ortho-phenyl phenol by weight in the concentrate | Apparent phenol coefficient of ortho-phenyl phenol in the diluted composition |
|---|---|
| 16 | 27 |
| 25 | 31 |
| 33 | 30 |
| 50 | 24 |

The above aqueous compositions were in the form of clear colloidal solutions which showed no tendency to settle out over a period of 160 days after preparation with the exception of that obtained from the 50 per cent composition. The latter composition was not entirely miscible with water or ortho-phenyl phenol started to settle out of the dilute aqueous dispersion in a few minutes.

Example 2

The partially neutralized sulphonated castor oil employed in this determination contained 25 per cent by weight of moisture, 5.5 per cent $SO_3$ by analysis, and in a 5 per cent solution had a pH value of 7.1. This product was substantially devoid of germicidal effectiveness against *E. typhii*. The following table sets forth the apparent phenol coefficients against *E. typhii* determined on 1 per cent aqueous dispersions of the phenol as prepared from the concentrated oily solutions of ortho-phenyl phenol in varying concentration.

| Per cent ortho-phenyl phenol by weight in the concentrate | Apparent phenol coefficient of ortho-phenyl phenol in the diluted composition |
|---|---|
| 10 | 25 |
| 15 | 33 |
| 20 | 33 |
| 25 | 36 |
| 30 | 40 |
| 40 | 33 |
| 50 | Unstable |

With a 10 per cent concentration of ortho-phenyl phenol in the concentrate and at lower concentrations there was a substantial decrease in the apparent phenol coefficient of the diluted material. At concentrations above 40 per cent, it was found that the ortho-phenyl phenol separated out when the concentrate was diluted with water.

Example 3

In this determination the partially neutralized sulphonated castor oil product contained 50 per cent by weight of moisture, and 5.5 per cent $SO_3$ by analysis. The pH of a 5 per cent water solution of this product was 9.5. This product had a phenol coefficient against *E. typhii* of less than 0.1.

A composition consisting of 1 part by weight of ortho-phenyl phenol and 5 parts of the sulphonated oil product, and prepared by warming and stirring the two materials together for a short time, was diluted with water so as to obtain 1 gram of ortho-phenyl phenol in 100 milliliters of solution. This dilute solution was still stable and showed no signs of separation after 118 days. The ortho-phenyl phenol in the diluted composition had an apparent phenol coefficient against *E. typhii* of 42. Similarly, a concentrate consisting of 1 gram of ortho-phenyl phenol dissolved in 6 grams of sulphonated oil product could be diluted to obtain colloidal solutions of good stability. The ortho-phenyl phenol in such diluted compositions had an apparent phenol coefficient of 41.

Example 4

1 gram of ortho-phenyl phenol was stirred and warmed with 5 grams of a partially neutralized sulphonated castor oil containing 50 per cent moisture and 5.5 per cent $SO_3$ by analysis, and having a pH value of 8.2 in 5 per cent aqueous solution. The resulting composition was a clear solution which was diluted with water to form 100 milliliters of a dispersion of the free phenol which was stable for over 105 days. The apparent phenol coefficient of ortho-phenyl phenol in this diluted material was 38.

In a similar manner compositions were prepared wherein a partially neutralized sulphonated castor oil containing 30 per cent water and 6 per sent $SO_3$, and having a pH in 5 per cent aqueous solution of 7.6, and a partially neutralized sulphonated mixture of castor and sperm oil containing 35 per cent moisture and 8 per cent $SO_3$, and having a pH in 5 per cent aqueous solution of 8.0, were each combined in the ratio of 5 parts of the oil product to 1 part by weight of ortho-phenyl phenol. Although each of these sulphonated products alone had an apparent phenol coefficient of less than 0.1 against *E. typhii*, dilute dispersions of the phenyl phenol-containing germicide concentrates indicated an apparent coefficient for ortho-phenyl phenol against *E. typhii* of more than 50 per cent in excess of theoretical.

The partially neutralized sulphuric acid derivatives of castor and sperm oils with which the invention is concerned do not seem to be corrosive or irritating to skin and tissue. Furthermore, they are compatible with many organic dyes and perfumes which, if desired, may be incorporated into the compositions described above. Similarly, other germicide and fungicide materials, as well as detergents and wetting agents, may be added to the described ortho-phenyl phenol concentrates provided only that such added materials be compatible with the partially neutralized sulphonated oil product and do not adversely affect the desirable characteristics of the new compositions.

Other ways of applying the principle of my invention may be employed instead of those explained, change being made as regards the materials or amounts thereof employed, provided the products claimed in the following claims be thereby obtained.

I therefore particularly point out and distinctly claim as my invention:

1. A composition comprising 24 parts by weight of ortho-phenyl phenyl dissolved in from 36 to 136 parts by weight of a liquid partially neutralized sulphonated oil selected from the group consisting of castor and sperm oils, and which in 5 per cent aqueous solution has a pH above 7.0.

2. A germicide concentrate having the following composition:

| | Per cent by weight |  |
|---|---|---|
| Ortho-phenyl phenol | 15 to | 40 |
| Carrer | 85 to | 60 |
| | 100 | 100 | which carrier is a partially neutralized sulphonation product of one of the group consisting of castor and sperm oils, and which in 5 per cent aqueous solution has a pH above 7.0.

3. A water-miscible composition consisting essentially of an alkaline partially neutralized sulphuric acid derivative of an oil selected from the group consisting of castor and sperm oils and dissolved therein from 15 to 40 per cent by weight of ortho-phenyl phenol based on the total weight of the composition.

4. A composition comprising from 36 to 136 parts by weight of a water-miscible partially neutralized sulphonated castor oil, a 5 per cent aqueous solution of which is characterized by having a pH above 7.0, and 24 parts by weight of ortho-phenyl phenol.

5. A water-miscible germicide concentrate comprising from 36 to 136 parts by weight of a liquid partially neutralized sulphonated castor oil, a 5 per cent aqueous solution of which has a pH of at least 7.5, and 24 parts by weight of ortho-phenyl phenol dissolved therein, the ortho-phenyl phenol being present in the sulphonated oil product in a highly dispersed condition which continues after dilution in water with the formation of a substantially transparent and stable colloidal solution of free ortho-phenyl phenol.

LUTHER S. ROEHM.